United States Patent

[11] 3,631,863

| [72] | Inventors | Frederick P. West<br>Route 1, Dawson, Ga. 31742;<br>Clarence F. West, 2210 Colonial Drive<br>N.E., Atlanta, Ga. 30319 |
|---|---|---|
| [21] | Appl. No. | 882,657 |
| [22] | Filed | Dec. 5, 1969 |
| [45] | Patented | Jan. 4, 1972 |

[54] CROP-ORIENTING MECHANISM
4 Claims, 4 Drawing Figs.

[52] U.S. Cl. .................................................. 130/30
[51] Int. Cl. ................................................... A01d
[50] Field of Search ...................................... 130/30 R, 30 A; 146/1

[56] References Cited
UNITED STATES PATENTS

| 2,763,114 | 9/1956 | Carruthers | 130/30 A |
| 2,943,629 | 7/1960 | Carruthers | 130/30 A |
| 3,119,395 | 1/1964 | Carruthers | 130/30 A |

*Primary Examiner*—Antonio F. Guida
*Attorney*—Newton, Hopkins & Ormsby

ABSTRACT: This invention relates to a means of orienting a harvested crop relative to a series of rotatably operable cutter disks used for severing stems from the crop being harvested. More particularly, this invention includes a crop-orienting attachment detailed in design to be operatively associated with a harvester stemmer bed which includes a series of laterally spaced and parallel arranged rows of rotatably operable cutter disks, with the cutter disks of each row being in substantially coplanar alignment. The crop-orienting attachment includes a substantially flat plate element having a series of laterally spaced and parallel arranged slots detailed for receiving the rows of cutter disks. An elongated crop-orienting member is fixed to the plate element adjacent each of the slots. Each of the crop-orienting members includes a vertically extending surface portion which is detailed relative to the slots such that the vertically extending surface is adjacent to one edge of the slot and is substantially parallel to an axis extending through the slot. Adjustable means is operatively associated with the crop-orienting attachment for adjusting the lateral spacing between the crop-orienting members and the cutter disks.

PATENTED JAN 4 1972

3,631,863

INVENTORS
FREDRICK P. WEST
CLARENCE F. WEST
BY: Newton, Hopkins, & Ormsby
ATTORNEYS 3,631,863

CROP-ORIENTING MECHANISM

BACKGROUND OF THE INVENTION

In harvesting certain farm crops, such as peanuts, after the peanuts have been separated from the vines, a length of stem remains attached to many of the peanuts. To remove the unwanted length of stems from the peanuts, the peanuts with stems are conveyed past a series of rotatably operable cutter disks which sever the length of stem from the peanuts as they are moved past the cutter disks.

In the past, as the peanuts are conveyed past the cutter disks, some of the peanuts would become oriented in a transverse alignment relative to the cutter disks which would cause the cutter disks to damage or crush the peanuts. None of the prior art peanut stemmers included any means to improve the orientation of the peanuts relative to the cutter disks to prevent the peanuts from being damaged.

OBJECTS OF THE INVENTION

It is therefore a primary object of this invention to provide a means of orienting a harvested crop in a predetermined angular orientation relative to rotatably operable cutter disks.

It is a further object of this invention to provide a crop-orienting attachment which can be easily attached to a crop stemmer bed having a series of rotatably operable cutter disks.

A still further object of this invention is to provide a crop-orienting means for a stemmer bed having a series of rotatably operable cutting disks with means for adjusting the lateral spacing of the crop-orienting means relative to the cutting disks.

Another object of this invention is to provide a crop-orienting attachment constructed as an integral unit.

An additional object of this invention is to provide a crop-orienting attachment simple in construction, economical to manufacture, and reliable in operation.

There and other objects and advantages in the details of construction will become apparent after reading the following description of one illustrative embodiment of the invention, with reference to the attached drawings wherein like reference characters have been used to refer to like parts throughout the several figures of the drawings.

BRIEF DESCRIPTION OF THE FIGURES OF DRAWING

DESCRIPTION OF THE ILLUSTRATIVE EMBODIMENT

Figure 1:
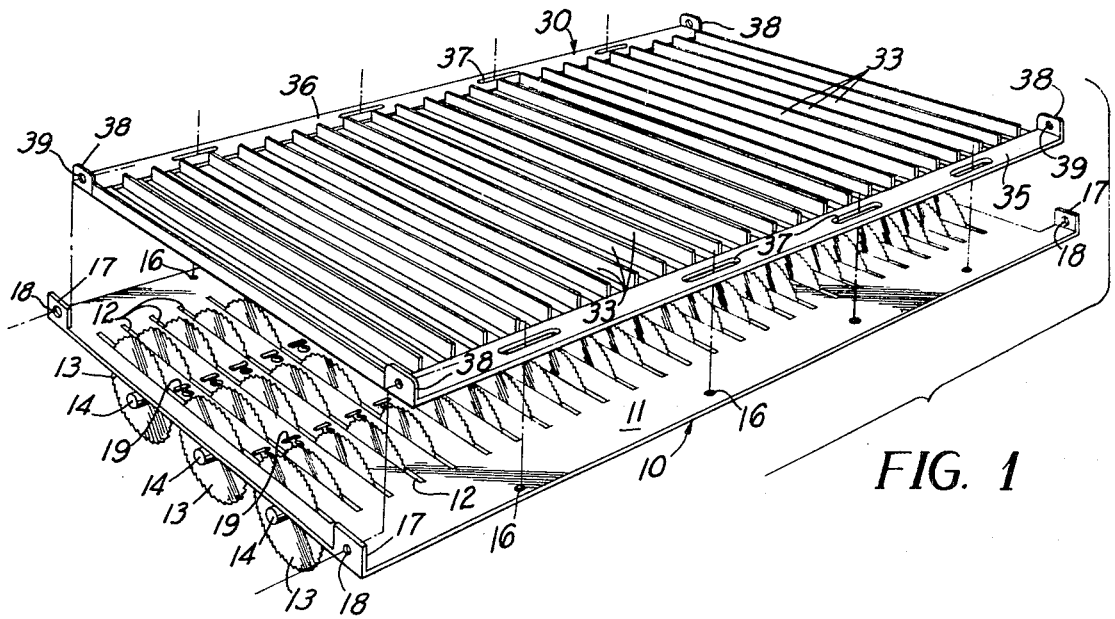
FIG. 1 is an exploded perspective view with the crop-orienting attachment shown vertically displaced above a conventional stemmer bed.
Figure 2:
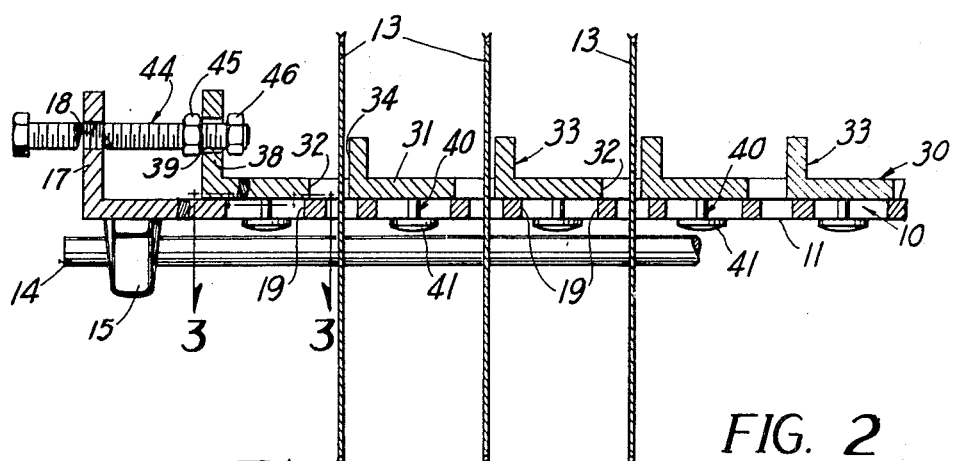
FIG. 2 is a fragmentary vertical sectional view taken substantially transversely of the crop-orienting attachment secured in place on a stemmer bed.

Referring now to the drawing, the crop-orienting attachment will be described with reference to a conventional harvester stemmer bed 10 and crop-orienting attachment 30. As shown in FIG. 1 and 2, the stemmer bed 10 includes a substantially flat support plate 11 having formed therein a plurality of elongated slots 12. The slots 12 are arranged in substantially fore and aft parallel relationship and laterally spaced relative to each other. Rotatably supported for operation in each of the slots 12 is a series of cutter disks 13. The cutter disks 13 are fixed to support shaft 14. Each shaft 14 is journaled for rotation in conventional bearing means, only one of which is shown at 15 in FIG. 2. The cutter disks 13 are provided with conventional drive means (not shown) for effecting rotation of the cutter disk to sever stems from peanuts in a stemming operation as the peanuts are conveyed or moved along the stemmer bed 10.

Figure 3:
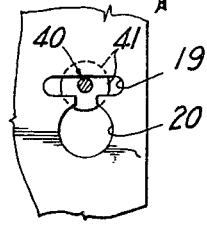
FIG. 3 is a fragmentary top plan view taken substantially along lines 3—3 of FIG. 2.
Figure 4:
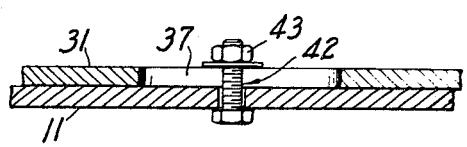
FIG. 4 is an enlarged vertical sectional view taken substantially longitudinally through one of the lateral adjustment slots with the attachment in position on the stemmer bed.

The stemmer bed support plate 11 is of substantially rectangular relationship and includes an upturned tab portion 17 located at each of the four corners. The upturned tab portions 17 includes a threaded opening 18 for receiving an adjustable connector which will be described herein below. As shown in FIG. 1, a series of laterally spaced openings 16 is provided adjacent the forward and rearward edge of the support plate 11. The openings 16 are provided for receiving adjustable connecting bolts and for attaching the crop-orienting means thereto as will be described herein below. Also provided in the support plate 11 at intermediate portions thereof are a series of connecting slots 19, as shown in FIG. 3. The slots 19 are formed to include an enlarged aperture 20 communicating therewith for receiving a bayonet-type connecting lug.

The crop-orienting means of the present invention includes a generally rectangular support plate 31 which has formed therein a series of laterally spaced and parallel arranged slots 32. The slots 32 are detailed in design for receiving therein the laterally spaced rows of cutter disks 13. Fixed to the plate 31 adjacent each of the slots 32 is an elongated crop-orienting member 33. The crop-orienting member 33 is detailed in design to include a vertically extending surface portion 34. As shown in FIG. 2, when the crop-orienting attachment is secured in place for a stemming operation, the cutter disks 13 extend through the slots 32 such that the cutter disks 13 are substantially parallel to the vertically extending surface portion 34 of the elongated crop-orienting members 33. The crop-orienting support plate 31 includes a forward border portion 5 and a rearward border portion 36. Formed in the forward and rearward border portions 35, 36 are a series of laterally spaced adjustment slots 37. The crop-orienting support plate 31 is provided with an upturned tab portion 38 adjacent each of the four corners. Each of the tab portions 38 is provided with an opening 39.

Referring now, to FIG. 2, the crop-orienting support plate is provided with a series of downwardly projecting bayonet-type connecting lugs 40. The bayonet-connecting lugs 40 are fixed to the support plate 31 intermediate the two border portions and between the elongated slots 32. The bayonet-connecting lugs 40 are provided with an enlarged retaining head 41. The bayonet-type connecting lugs 40 are detailed in design to be inserted in the stemmer bed receiving openings 20 when the crop-orienting attachment is positioned thereon. The function of the bayonet-connecting lugs 40 and slots 19 is to provide a securing means for holding the crop-orienting support plate 31 firmly secured to the stemmer bed 10 adjacent an intermediate portion thereof. The stemmer bed 10 and crop-orienting attachment 30 are secured to each other along the border portions 35 and 36 by means of a slot 37, openings 16 and connecting bolts 42. The bolts 42 are inserted through the openings 16 in the support plate 11 and through the slots 37 in the crop-orienting attachment border portions 35, 36. The elongated slots 37 permit lateral adjustment of the crop-orienting attachment 30 relative to the stemmer bed 10 whereby the lateral spacing between the cutter disk 13 and the vertically extending surface portions 34 can be adjusted.

As shown in FIg. 2, lateral adjustment of the crop-orienting attachment 30 relative to the stemmer bed 10 can be effected by means of a threaded adjustment bolt 44 which is threaded through the openings 18 in the stemmer bed tabs 17. The extended end of the threaded adjustment bolt 44 is inserted through the openings 39 in the crop-orienting attachment tab portions 38. A pair of threaded adjustment nuts 45, 46 are provided on the adjustment bolt 44 for locking the crop-orienting attachment in the desired position relative to the stemmer bed 10.

ATTACHMENT SEQUENCE OF OPERATION

In positioning the crop-orienting attachment 30 on the stemmer bed 10, the support plate 31 of the crop-orienting attachment is positioned over the stemmer bed 10 whereby the rows of cutter disks 13 will extend through the slots 32. The crop-orienting attachment support plate 31 is first aligned relative to the stemmer beds support plate 11 whereby the bayonet-connecting lug enlarged heads 41 will pass through the openings 20. After the bayonet-connecting lugs with enlarged head 41 has been inserted through the openings 20, the crop-orienting attachment support plate 31 is moved rearwardly until the bayonet-connecting lug 40 is in transverse alignment with the slots 19 which will permit the above-described lateral adjustment of the crop-orienting attachment to the stemmer bed. After the bayonet-type connecting lugs 40 are in alignment with the slots 19, a series of threaded adjustment bolts 42 are inserted through the opening 16 and slots 37 and adjustment nuts 43 are threaded thereon loosely until the correct lateral adjustment of the crop-orienting attachment has been effected. The adjustment bolts 44 are then threaded through the openings 18 and through the openings 39. Before the extended end of the adjustment bolt 44 was inserted through the opening 39, a first locknut 45 was threaded onto the connecting lug 44 and after the connecting lug 44 has been extended through the opening 39 a second locknut is threaded on the extended end of the connecting bolt 44. The threaded connecting bolt 44 and locking nuts 45 and 46 are then adjusted to provide a correct alignment of the crop-orienting surface portions 34 relative to the cutter disk 13. The nuts 43 of the connecting bolts 42 are then tightened to securely clamp the crop-orienting attachment 30 in a correct aligned position.

The slots 32 and the crop-orienting attachment are detailed in design to prevent peanuts or any other harvested crop from passing therethrough and are detailed to support a peanut or other harvested crop in an angularly supported position relative to the cutter disks 12 as the harvested crop moves along the stemmer bed in a stemming operation. If the peanuts or other harvested crop are supported in an angularly disposed relationship relative to the cutter disks 13, extend of damage to the peanuts being crushed by the cutter disks is substantially eliminated.

In a conventional harvester, the stemmer bed is normally supported in an inclined position whereby the peanuts being subjected to a stemming operation will be conveyed by gravity past the stemmer bed. After the peanuts have moved past the stemmer bed and the stems have been severed from the peanuts, the peanuts are then allowed to pass over conventional grating means (not shown) whereby the stems will be separated from the peanuts. Also, conventional collecting means (not shown) is normally provided adjacent the separating grate for collecting the peanuts. Since the collection means or separating grate form no part of the present invention, they have not been illustrated herein.

The above described illustrative embodiment discloses an attachment which can be attached to the conventional harvester stemmer beds. However, it is possible in the construction of the stemmer beds to provide elongated crop-orienting members substantially similar to the above crop-orienting members integral with the stemmer bed support plate 11 adjacent the slots 12.

It is apparent that the above described illustrative embodiment of a crop-orienting attachment is capable of obtaining the above stated objects and advantages. It is obvious that those skilled in the art may make modifications in the details of the construction without departing from the spirit of the invention, which is to be limited only by the scope of the appended claims.

What is claimed is:

1. An attachment for use in a harvester having a series of cutter disks rotatably operable to sever stems from a crop being harvested, said attachment comprising, in combination; a crop-orienting means detailed to be supported adjacent each cutter disk of said series for orienting said harvested crop in a predetermined angular relationship relative to said cutting disks, whereby said harvested crop will pass said cutting disks in a stemming operation without being damaged by said disks, said series of cutting disks including a plurality of rows of laterally spaced cutting disks and said attachment including a plurality of laterally spaced crop-orienting means so detailed that a crop-orienting means is supporting adjacent each of said cutting disks of said rows of cutting disks, each of said cutting disks in a row of cutting disks being supported for operation in a substantially coplanar relationship, and said crop-orienting means including a plurality of elongated members, each said member including a vertically extending surface supported in laterally spaced parallel relationship relative to the plane of said cutting disks, all of said elongated orienting members being connected together to form an integral crop-orienting unit, which unit includes means adjustably supporting said orienting unit relative to said cutting disk whereby the lateral spacing between said elongated members and said cutting disks can be adjusted.

2. An attachment as in claim 1 further characterized in that said means connecting said elongated orienting members includes a substantially flat plate means having a series of laterally spaced slots for receiving said laterally spaced rows of cutting disks and wherein one of said elongated members is fixed to said plate adjacent each of said slots, said elongated members being so detailed relative to said plate that said vertically extending surfaces are disposed adjacent to said slots and substantially parallel to axes extending through said slots.

3. A stemmer bed for use in a harvester comprising in combination:

a series of cutting disks rotatably supported on said bed for severing stems from a crop being harvested; and a crop-orienting means supported on said bed adjacent each cutting disk for orienting said harvested crop in a predetermined angular relationship relative to said cutting disks whereby said harvested crop will pass said cutting disks in a stemming operation without being damaged by said cutting disks, said series of cutting disks including a plurality of rows of laterally spaced cutting disks and said crop-orienting means including a plurality of laterally spaced crops-orienting members so detailed that a crop-orienting member is supported adjacent each cutting disk of said rows of cutting disks, each cutting disk of said rows of cutting disks being supported for operation in a substantially coplanar relationship and said crop-orienting means including a plurality of elongated members with each of said members including a vertical surface supported in laterally spaced parallel relationship relative to the plane of said cutting disks, each of said elongated members being connected together to form an integral crop-orienting unit; and means adjustably supporting said orienting unit relative to said cutting disks so that the lateral spacing between said elongated members and said cutting disks can be adjusted.

4. A stemmer bed as in claim 3 further characterized in that said means connecting said elongated members includes a substantially flat plate means having a series of laterally spaced and parallel arranged slots for receiving said laterally spaced rows of cutting disks and wherein one of said elongated members is fixed to said plate adjacent each of said slots, said elongated members being so arranged relative to said plate that said vertically extending surfaces are disposed adjacent to said slots and substantially parallel to axes extending through said slots.

* * * * *